United States Patent
Wagner et al.

(10) Patent No.: US 12,122,798 B2
(45) Date of Patent: Oct. 22, 2024

(54) PERCHLORINATED DISILENES AND GERMASILENES AND ALSO NEOPENTATETRELANES, A METHOD FOR THE PREPARATION THEREOF AND USE THEREOF

(71) Applicant: Evonik Operations GmbH, Essen (DE)

(72) Inventors: Matthias Wagner, Maintal/Doernigheim (DE); Chantal Isabell Kunkel, Frankfurt (DE); Hans-Wolfram Lerner, Oberursel (DE)

(73) Assignee: Evonik Operations GmbH, Essen (DE)

(*) Notice: Subject to any disclaimer, the term of this patent is extended or adjusted under 35 U.S.C. 154(b) by 575 days.

(21) Appl. No.: 17/304,788

(22) Filed: Jun. 25, 2021

(65) Prior Publication Data
US 2022/0002324 A1   Jan. 6, 2022

(30) Foreign Application Priority Data

Jul. 1, 2020   (EP) .................... 20183466

(51) Int. Cl.
*C07F 7/12*   (2006.01)
*C01B 33/08*   (2006.01)
*C07F 7/16*   (2006.01)
*C07F 7/30*   (2006.01)

(52) U.S. Cl.
CPC ............... *C07F 7/30* (2013.01); *C01B 33/08* (2013.01); *C07F 7/12* (2013.01); *C07F 7/16* (2013.01); *C01P 2002/86* (2013.01)

(58) Field of Classification Search
CPC .... C01B 33/08; C07F 7/12; C07F 7/16; C07F 7/30; C01P 2002/86; C01G 17/00; C01G 17/04
See application file for complete search history.

(56) References Cited

U.S. PATENT DOCUMENTS 11,814,300 B2 * 11/2023 Wagner .................. C01B 33/06

FOREIGN PATENT DOCUMENTS

| EP | 3 409 645 A1 | 12/2018 | |
|----|---|---|---|
| EP | 3 409 678 A1 | 12/2018 | |
| EP | 3 410 466 A1 | 12/2018 | |
| EP | 3653578 A1 * | 5/2020 | ............. C01B 33/06 |

OTHER PUBLICATIONS

Schweizer, Julia I., et al. "A disilene base adduct with a dative Si—Si single bond." Angewandte Chemie 128.5 (2016): 1814-1818.*
Joiner, Jr., James Ray, 1943—Systematic Preparation of Chloropolysilanes and Chlorosilylgermanes. Tufts University, Ph.*
Teichmann, Julian, et al. "Tris (trichlorosilyl) tetrelide anions and a comparative study of their donor qualities." Chemistry—A European Journal 25.11 (2019): 2740-2744.*

(Continued)

*Primary Examiner* — Richard M Rump
(74) *Attorney, Agent, or Firm* — Oblon, McClelland, Maier & Neustadt, L.L.P.

(57) ABSTRACT

The invention provides disilenes, germasilenes and neopentatetrelanes, a method for the preparation thereof and use thereof.

10 Claims, 5 Drawing Sheets

$^{29}$Si-NMR spectrum of C where E = Si, R = Cl and E' = Ge.

(56) References Cited

OTHER PUBLICATIONS

Teichmann, J., and M. Wagner. "Silicon chemistry in zero to three dimensions: from dichlorosilylene to silafullerane." Chemical communications 54.12 (2018): 1397-1412.*

European Search Report issued Oct. 20, 2020 in European Application 20183466.0 filed on Jul. 1, 2020, citing documents AO & AW-AZ therein, 10 pages (with English Translation of Categories of Cited Documents & Written Opinion).

Teichmann et al., "Tris(trichlorosilyl) tetrelide Anions and a Comparative Study of Their Donor Qualities", Chemistry—A European Journal, vol. 25, No. 11, 2019, pp. 2740-2744, XP055580991.

Urry, "Systematic Synthesis in Polysilane Series", Accounts of Chemical Research, ACS, vol. 3, No. 9, Sep. 1970, pp. 306-312, XP002596966.

Trandell et al., "A Study of the Amine-Induced Disproportionations of Various Methylchlorodisilanes", Journal of Inorganic and Nuclear Chemistry, vol. 40, No. 7, Jan. 1978, pp. 1305-1308, XP055717010.

Du Mont et al., "Intermediates and Products of the Hexachlorodisilane Cleavage of Group 14 Element Phosphanes and Amines—Molecular Structure of Di-tert-butyl(trichlorosilyl)phosphane in the Gas Phase Determined by Electron Diffraction and ab Initio Calculations" European Journal of Inorganic Chemistry, Jan. 1999, 12 pages, XP055406900.

* cited by examiner

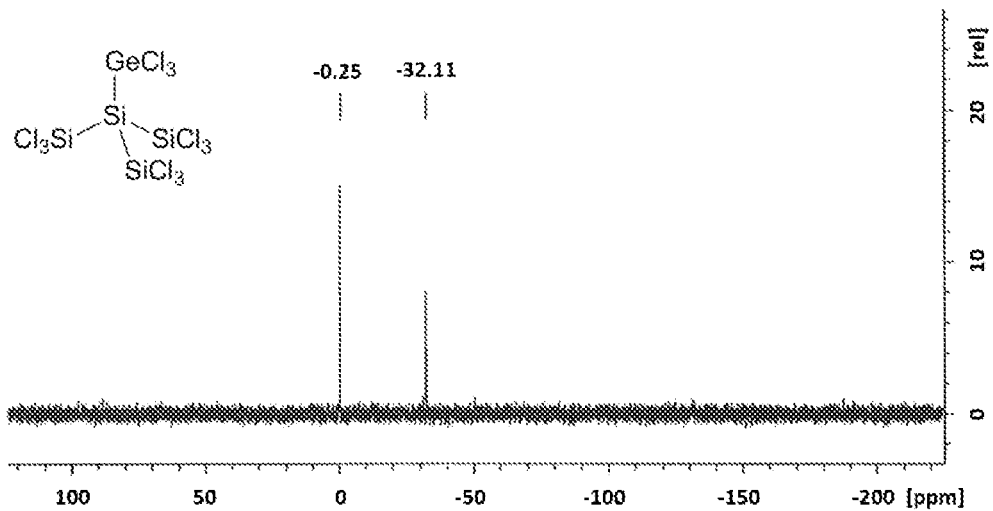
Fig. 1: $^{29}$Si-NMR spectrum of C where E = Si, R = Cl and E' = Ge.
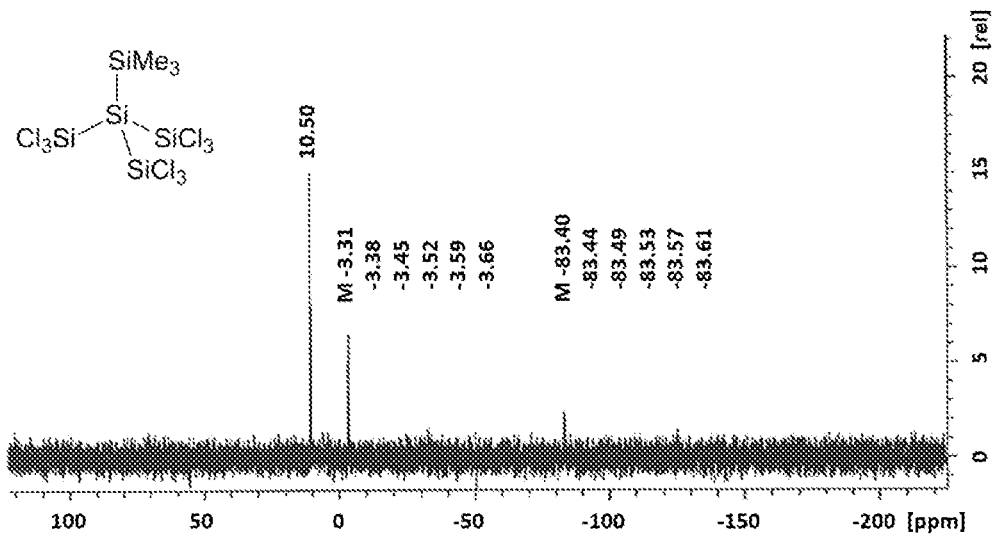
Fig. 2: $^{29}$Si-NMR spectrum of C where E = E' = Si, and R = Me.

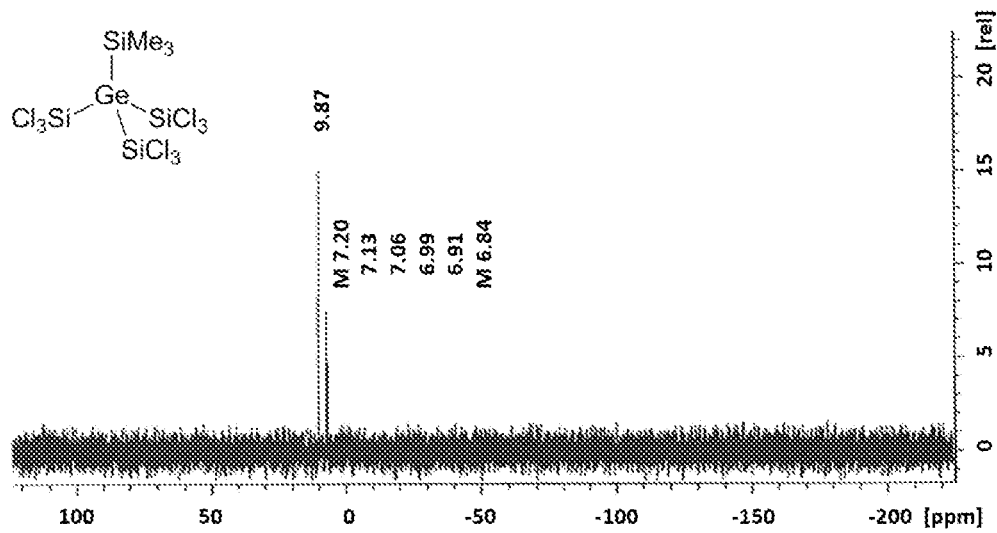
Fig. 3: $^{29}$Si-NMR spectrum of C where E = Ge, R = Me, and E' = Si.
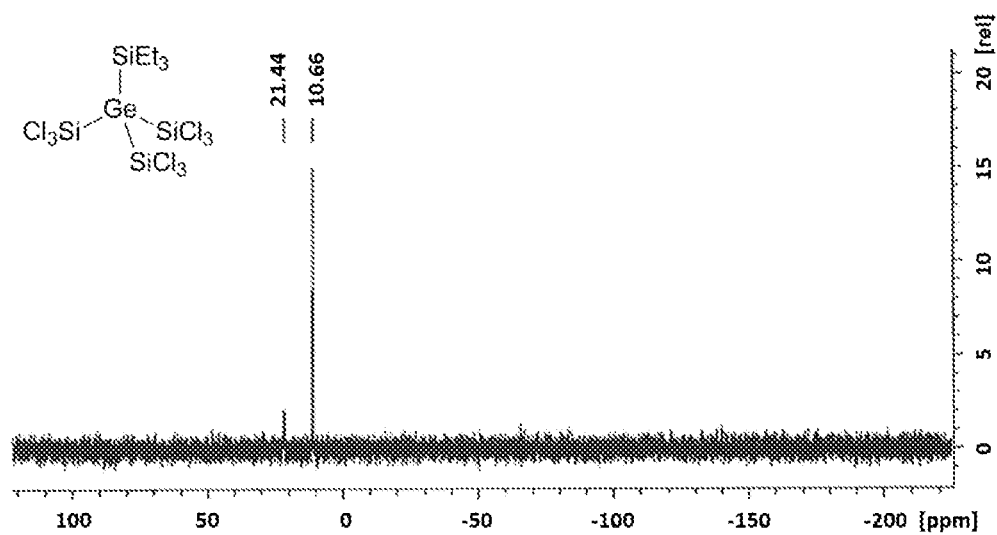
Fig. 4: $^{29}$Si-NMR spectrum of C where E = Ge, E' = Si, and R = Et.

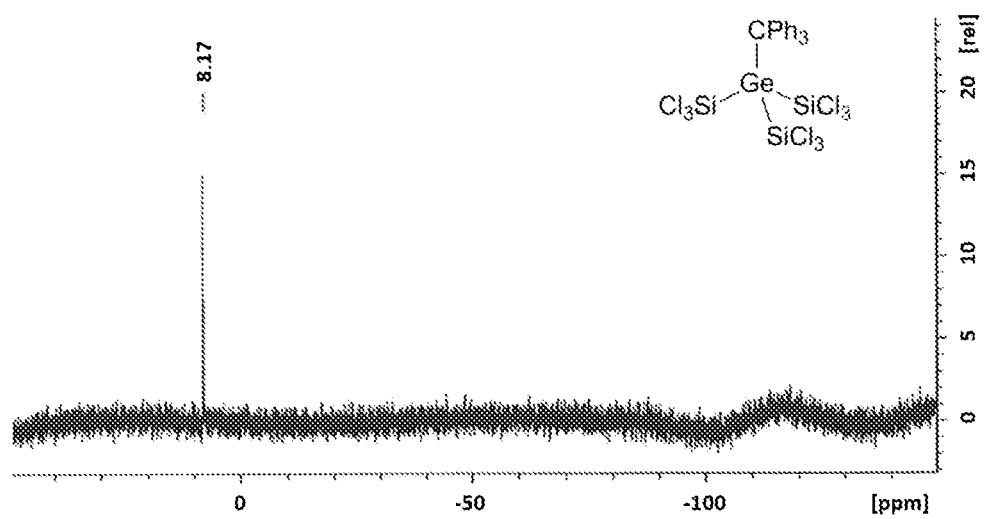
Fig. 5A : $^{29}$Si {1H}-NMR spectrum of C where E = Ge, E' = C, and R = Ph.
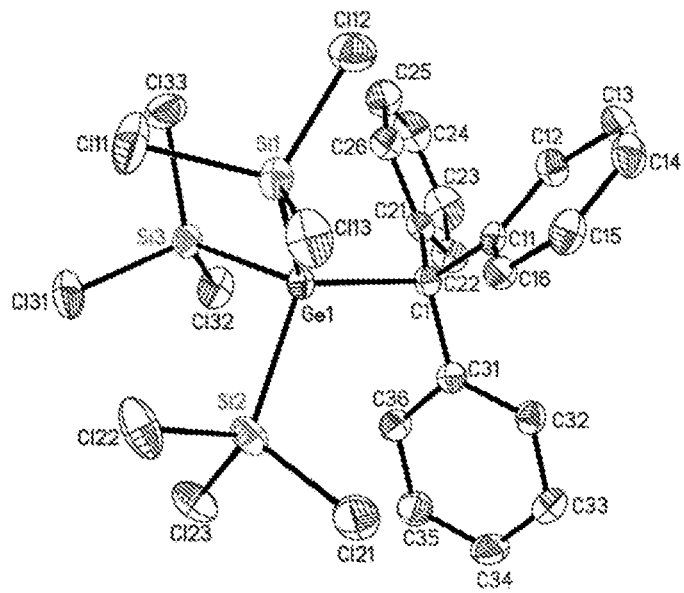
Fig. 5B : Crystal structure of C where E = Ge, E' = C, and R = Ph.

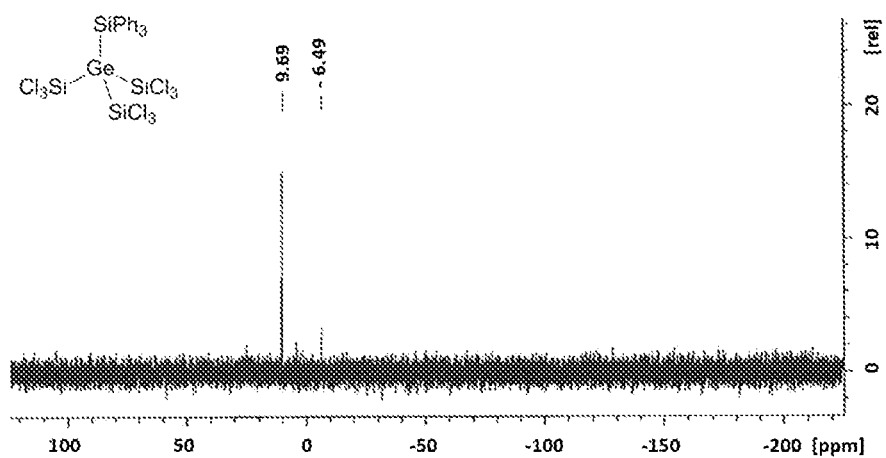
Fig. 6A: $^{29}$Si-NMR spectrum of C where E = Ge, E' = Si, and R = Ph.
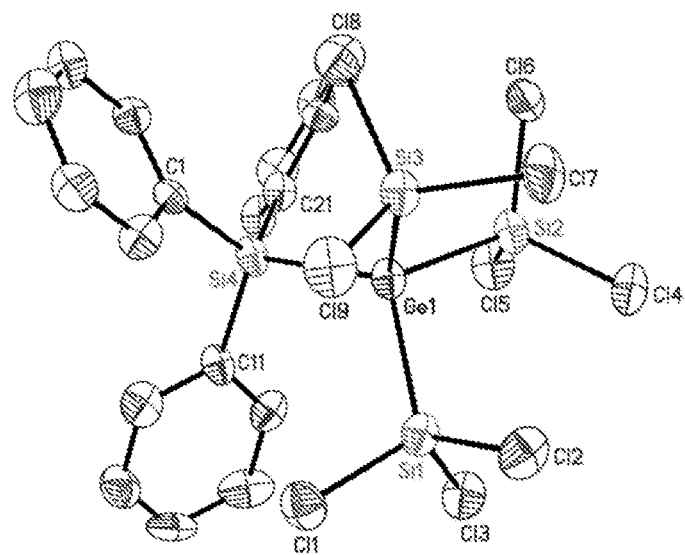
Fig. 6B: Crystal structure of C where E = Ge, E' = Si, and R = Ph.

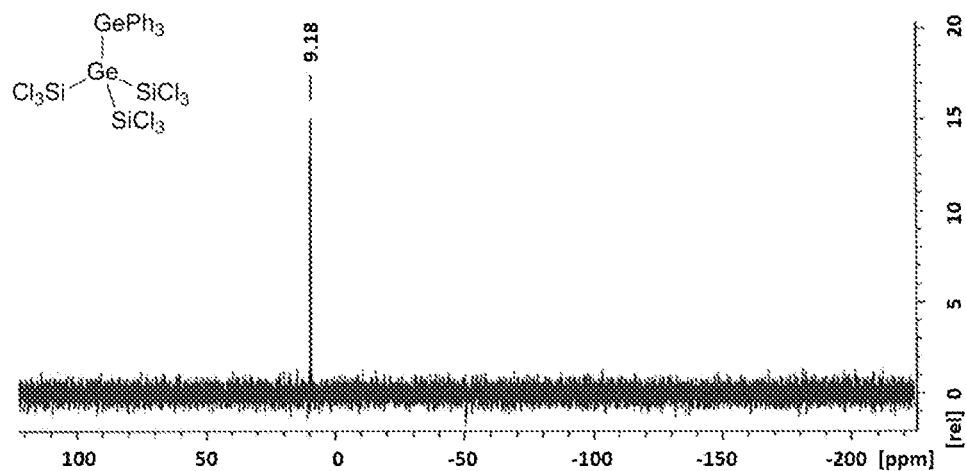
Fig. 7A: $^{29}$Si-NMR spectrum of C where E = E' = Ge, and R = Ph.
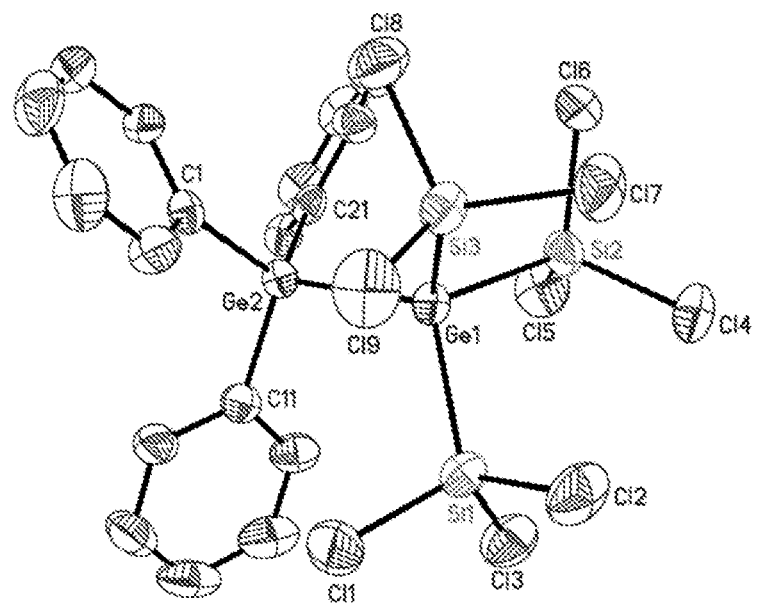
Fig. 7B: Crystal structure of C where E = E' = Ge, and R = Ph.

PERCHLORINATED DISILENES AND GERMASILENES AND ALSO NEOPENTATETRELANES, A METHOD FOR THE PREPARATION THEREOF AND USE THEREOF

The present invention relates to disilenes, germasilenes and neopentatetrelanes, a method for the preparation thereof and use thereof.

Practically nothing is currently known about germasilenes and neopentatetrelanes. Thus, for the purposes of fundamental research, the aim is to find novel compounds and to seek novel preparation routes, in particular also with respect to potential industrial and optionally improvable applications.

The patent application EP 3 410 466 A1 discloses trichlorosilyltrichlorogermane and chlorosilylarylgermanes, which are obtained in dissolved form and by reacting an arylchlorogermane with hexachlorodisilane in the presence of a catalyst.

EP 3 409 645 A1 discloses and prepares triphenylgermylsilane by dissolving trichlorosilyltriphenylgermane and $AlCl_3$ in a solvent and is reduced by addition of a hydride.

EP 3 409 678 A1 presents various halogermanides which are obtained by reacting $GeCl_4$ with hexachlorodisilane.

FIG. 1 shows a nuclear magnetic resonance (NMR) spectrum of one example of the present disclosure.

FIG. 2 shows an NMR spectrum of another example of the present disclosure.

FIG. 3 shows an NMR spectrum of yet another example of the present disclosure. FIG. 4 shows an NMR spectrum of yet another example of the present disclosure.

FIGS. 5A and 5B respectively show an NMR spectrum and a crystal structure of yet another example of the present disclosure.

FIGS. 6A and 6B respectively show an NMR spectrum and a crystal structure of yet another example of the present disclosure.

FIGS. 7A and 7B respectively show an NMR spectrum and a crystal structure of yet another example of the present disclosure.

The object of the present invention is to provide novel silicon-germanium compounds and a method for the preparation thereof.

The object was solved by reacting tris(trichlorosilyl)tetrelides with aluminium trichloride in the presence of electrophilic substances. These compounds represent a novel substance class.

The invention provides the comp und neopentatetrelane of the general formula C

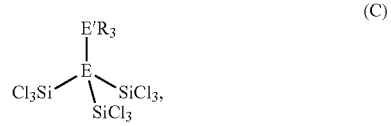

wherein each independently in pairs E is Si or Ge, E' is C, Si or Ge, and R is Cl, Me, Et or Ph.

For the preparation, a synthetic route starting from inexpensive reactants has been found.

The invention therefore also provides a method for preparing the neopentatetrelane C according to the invention, in which (a) a salt $[X_4N]$- or $[X_4P]$-tris(trichlorosilyl)tetrelide, where the radical X is selected from Me, Et, iPr, nBu or Ph,
the tris(trichlorosilyl)tetrelide having the general formula $A^-$

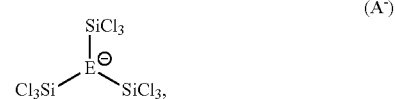

where E=Si or Ge,
is dissolved in a solvent, and subsequently either the steps b and c, or the step d is carried out (b) the tris(trichlorosilyl)tetrelide dissolved in step a is reacted in the presence of a Lewis acid, wherein a disilene or germasilene is obtained having the general formula B

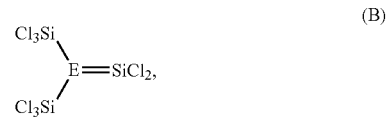

where E=Si or Ge, and (c) the disilene or germasilene B is reacted with a tetrel chloride $R_3E'$-Cl at a temperature of −80° C. to 40° C., where E'=C, Si or Ge, and where R=Cl, Me, Et or Ph, wherein the neopentatetrelane C is obtained, or (d) the tris(trichlorosilyl)tetrelide dissolved in step a is introduced
into a suspension at a temperature of −80° C. to 40° C. comprising a Lewis acid, a tetrel chloride $R_3E'$-Cl where E'=C, Si or Ge, and where R=Cl, Me, Et or Ph,
and a solvent, wherein the neopentatetrelane C is obtained.

The method according to the invention has the advantage that the composition of the neopentatetrelanes obtained can be varied over a wide range by a simple change of electrophilic substrate. As a result, a multiplicity of derivatives having customized properties can be prepared for the production of semiconductor materials. In particular, the Si/Ge ratio can be set in a defined manner in the method according to the invention and therefore produces neopentatetrelanes C having an outstanding importance for the production of semiconductor materials.

The invention therefore also relates to the use of the neopentatetrelane C according to the invention or obtained according to the invention for generating GeSi layers.

The invention is explained in more detail below.

It may be advantageous in the method according to the invention to set the temperature during the conversion reaction within the range from −100° C. to 40° C.

In step d of the method according to the invention, in the case that E=Si is selected, the conversion reaction already takes place at a temperature of −78° C.

The compound of the structure B, in the case that E=Ge, is also referred to as a "germasilene" in the context of the invention.

The preparation of a suspension comprising the components listed in step d is known to those skilled in the art.

The solution obtained according to step a is preferably added dropwise to the suspension, if step d is carried out.

The method according to the invention according to steps a, b and c has the advantage that the di- or germasilene B can be stored by reacting the tris(trichlorosilyl)tetrelide dissolved in step a in the presence of a Lewis acid together with at least one further reagent in step b and the method discontinued after step b.

The additional reagent used is preferably anthracene or an anthracene derivative, preferably 2,7-di-tert-butylanthracene.

The invention therefore also provides compounds of the general formula B, prepared by the method according to the invention, wherein anthracene or an anthracene derivative is additionally used in step b of the method and the method is discontinued after step b prior to step c.

Preferably, B may be obtained in a melt-sealed NMR tube, in which E═Ge is selected and (A⁻), AlCl₃ and anthracene are weighed in in equimolar amounts, $C_6D_G$ is added and the NMR tube is subsequently melt-sealed under vacuum and immediately heated to 120° C.

In the method according to the invention, the steps b and c, or the step d, are preferably carried out at room temperature. In the context of the invention "ambient temperature" is understood to mean the temperature 20° C.

In the method according to the invention, the solvent preferably used in step a and/or in step d may preferably be dichloromethane, benzene, $C_6D_6$, or $CD_2Cl_2$. With the solvent dichloromethane or $CD_2Cl_2$ used by way of preference, the neopentatetrelane C according to the invention may be obtained. In the case of the preparation according to the invention of $(Cl_3Si)_3GeSiMe_3$, preference may also be given to using $C_6D_6$.

In the method according to the invention, preference may also be given to using X=nBu in step a.

It may be advantageous in step b or d of the method according to the invention to use AlCl₃ as Lewis acid.

In the method according to the invention, the step d or the steps b and c may preferably be carried out with mixing, preferably with stirring, and over a total period of 1 to 24 hours, preferably in total 12 h, and preferably under protective gas, preferably under nitrogen or argon, and subsequently the solvent is removed, preferably in a dry oxygen-free environment, particularly preferably in an isolated environment, further preferably at standard pressure or a pressure in the range of 1 to 500 hPa, particularly preferably at standard pressure, and the neopentatetrelane C formed is extracted, preferably with n-hexane, particularly preferably with boiling n-hexane.

The examples which follow provide additional illustration of the present invention without restricting the subject-matter. In the context of the invention, "ambient conditions" are understood to mean the parameters of the standard atmosphere at 20° C. and a pressure of 1013.25 hPa, the so-called "ambient pressure".

Analytical Methods for Determination of the Crystal Structure

The data for all crystal structures were collected at 173 K using a STOE IPDS II two-circle difractometer with a Genix microfocus tube having mirror optics using MoK, radiation (A=0.71073 Å) and scaled using the frame scaling procedure of the X-AREA program (Stoe & Cie, 2002). The structures were solved by direct methods with the aid of the SHELXS program (Sheldrick, 2008) and refined on $F^2$ by the full matrix least squares technique. Cell parameters were determined by refinement on θ values of the reflections with I>6σ(I).

EXAMPLE 1: PREPARATION OF NEOPENTATETRELANE (C) WHERE E═Si, R═Cl AND E'═Ge

A solution of 0.361 g or 0.535 mmol corresponding to 1.0 eq of [nBu.N][(Cl₃Si)₃Si] in 6 ml of $CH_2Cl_2$ solvent was added dropwise to a suspension of 0.073 g or 0.547 mmol corresponding to 1.0 eq of AlCl₃ and 0.144 g or 0.671 mmol corresponding to 1.3 eq of GeCl₄ in 5 ml of $CH_2Cl_2$ solvent, until all the solid had dissolved. An orange-coloured solution was obtained which was stirred for 12 hours under ambient conditions.

The solvent was removed at atmospheric pressure and the orange-coloured solid was removed with 3×10 ml of n-hexane. This gave 0.193 g or 0.316 mmol, corresponding to a proportion of 59% neopentatetrelane (C) as a colourless liquid.

The $^{29}$Si-NMR spectrum of this example is shown in FIG. 1.

Results of a $^1$H, $^{13}$C and $^{29}$Si NMR spectroscopic analysis:

$^{29}$Si NMR (99.4 MHz, $CD_2Cl_2$):
δ=−0.25 ((Cl₃Si)₃SiGeCl₃), −32.1 ppm ((Cl₃Si)₃SiGeCl₃)
Hydrogenation of this Neopentatetrelane.

In a melt-sealable NMR tube, 0.55 ml of a 1M solution of (iBu₂)AlH in $C_6H_{12}$, which corresponds to 0.08 g or 0.55 mmol and thus 14.0 eq of (iBu₂)AlH, and 0.25 ml Et₂O were added to 0.02 g or 0.04 mmol corresponding to 1.0 eq of neopentatetrelane.

After 42 hours, the colourless solution was investigated by NMR spectroscopy. Results:
$^1$H NMR (500.2 MHz, $C_6H_{12}$): δ=3.36 ppm (q, $^4J_{HH}$=7.0 Hz, (H₃Si)₃SiGeH₃);
$^{29}$Si NMR (99.4 MHz, $C_6H_{12}$): δ=−95.4 ppm (q, $^1J_{Si-F}$=200 Hz, (H₃Si)₃SiGeH₃);
$^1$H/$^{29}$Si HSQC-NMR (500.2/99.4 MHz, $C_6H_{12}$): δ=3.36/−95.4 ppm;
$^1$H/$^{29}$Si HMBC-NMR (500.2/99.4 MHz, $C_6H_{12}$): δ=3.36/−95.4, 3.36/−136.9 ppm.

EXAMPLE 2: PREPARATION OF NEOPENTATETRELANE (C) WHERE E=E'=Si, UND R=Me

A solution of 0.238 g or 0.353 mmol corresponding to 1.0 eq of [nBu₄N][(Cl₃Si)Si] in 3 ml of $CH_2Cl_2$ solvent was added dropwise to a suspension of 0.049 g or 0.367 mmol corresponding to 1.0 eq of AlCl₃ and 0.073 g or 0.672 mmol corresponding to 1.9 eq of Me₃SiCl in 1 ml of $CH_2Cl_2$ solvent, until all the solid had dissolved. A colourless solution was obtained.

The solvent was removed with stirring at atmospheric pressure and the colourless solid was extracted with 3×3 ml of n-hexane. This gave 0.134 g or 0.266 mmol, corresponding to a proportion of 75% neopentatetrelane (C) as a colourless crystalline solid.

The $^{29}$Si-NMR spectrum of this example is shown in FIG. 2.

Results of a $^1$H, $^{13}$C and $^{29}$Si NMR spectroscopic analysis:

$^{29}$Si NMR (99.4 MHz, $CD_2Cl_2$): δ=10.5 ppm (s, (Cl₃)₃ SiSiMe₃), −3.5 ppm (sext., $^2J_{H,Si}$=7.0 Hz, (Cl₃Si)₃SiSiMe₃), −83.5 ppm (m, (Cl₃Si)SiSiMe₃).

$^1$H NMR (500.2 MHz, CD$_2$Cl$_2$): δ=0.58 ppm;
$^{13}$C{$^1$H} NMR (125.8 MHz, CD$_2$Cl$_2$): δ=0.4 ppm;
$^1$H/$^{13}$C HSQC NMR (500.2/125.8 MHz, CD$_2$Cl$_2$): δ=0.58/0.4 ppm;
$^1$H/$^{29}$Si HMBC NMR (500.2/99.4 MHz, CD$_2$Cl$_2$): δ=0.58/−3.5, 0.58/−83.5 ppm.

EXAMPLE 3: PREPARATION OF NEOPENTATETRELANE (C), WHERE E=Ge, E'=Si, AND R=Me

In a melt-sealed NMR tube, 0.100 g or 0.139 mmol corresponding to 1.0 eq of [nBu$_4$N][(Cl$_3$Si)$_3$Ge],
0.019 g or 0.142 mmol corresponding to 1.0 eq of AlCl$_3$ and
0.093 g or 0.856 mmol corresponding to 6.2 eq of Me$_3$SiCl
were reacted in 0.8 ml of CD$_2$Cl$_2$ solvent, whereby a yellow solution with orange coloured solid was obtained.

The solvent was removed at atmospheric pressure and the solid was isolated with 3×3 ml of boiling n-hexane. This gave 0.073 g or 0.133 mmol, corresponding to a proportion of 96% neopentatetrelane (C) where E=Ge, E'=Si, and R=Me.

The $^{29}$Si-NMR spectrum of this example is shown in FIG. 3.

Results of a $^1$H, $^{13}$C and $^{29}$Si NMR spectroscopic analysis:
$^{29}$Si NMR (99.4 MHz, CD$_2$Cl$_2$): δ=9.9 ppm (s, (Cl$_3$Si)$_3$GeSiMe$_3$),
7.2 ppm (sext., $^2$J$_{H,Si}$=7.0 Hz, (Cl$_3$Si)$_3$GeSiMe$_3$).
$^1$H NMR (500.2 MHz, CD$_2$Cl$_2$): δ=0.61 ppm;
$^{13}$C{$^1$H} NMR (125.8 MHz, CD$_2$Cl$_2$): δ=1.2 ppm;
$^1$H/$^{13}$C HSQC NMR (500.2/125.8 MHz, CD$_2$Cl$_2$): δ=0.61/1.2 ppm;
$^1$H/$^{29}$Si HMBC NMR (500.2/99.4 MHz, CD$_2$Cl$_2$): δ=0.61/7.0 ppm.

EXAMPLE 4: PREPARATION OF NEOPENTATETRELANE (C), WHERE E=Ge, E'=Si, AND R=ET

In a melt-sealed NMR tube, 0.10 g or 0.14 mmol corresponding to 1.0 eq of [nBu$_4$N][(Cl$_3$Si)$_3$Ge],
0.02 g or 0.14 mmol corresponding to 1.0 eq of AlCl$_3$ and
0.13 ml or 0.12 g corresponding to 5.6 eq of Et$_3$SiCl
were reacted in 0.8 ml of CD$_2$Cl$_2$ solvent, whereby a yellow solution was obtained.

The solvent was removed at atmospheric pressure.

By means of subsequent extraction with 3×3 ml of boiling n-hexane, removal of the solvent and Et$_3$SiCl, this gave 0.08 g or 0.14 mmol corresponding to a proportion of 97% neopentatetrelane (C) where E=Ge, E'=Si, and R=Et as a pale yellow solid.

The $^{29}$Si-NMR spectrum of this example is shown in FIG. 4.

Results of a $^1$H, $^{13}$C and $^{29}$Si NMR spectroscopic analysis:
$^{29}$Si NMR (99.4 MHz, CD$_2$Cl$_2$): δ=21.4 ppm (m, (Cl$_3$Si)$_3$GeSiCH$_2$CH$_3$), 10.7 ppm (s, (Cl$_3$Si)$_3$GeSiCH$_2$CH$_3$).
$^1$H NMR (500.2 MHz, CD$_2$Cl$_2$): δ=1.14 ppm (m, (Cl$_3$Si)$_3$GeSiCH$_2$CH$_3$);
$^{13}$C{$^1$H} NMR (125.8 MHz, CD$_2$Cl$_2$): δ=8.4 ((Ca$_3$Si)$_3$GeSiCH$_2$CH$_3$), 6.5 ppm ((Cl$_3$Si)$_3$GeSiCH$_2$CH$_3$);
$^1$H/$^{13}$C HMBC NMR (500.2/125.8 MHz, CD$_2$Cl$_2$): δ=1.14/8.4, 1.14/6.5 ppm;
$^1$H/$^{29}$Si HMBC NMR (500.2/99.4 MHz, CD$_2$Cl$_2$): δ=1.14/21.4 ppm.

EXAMPLE 5: PREPARATION OF NEOPENTATETRELANE (C), WHERE E=Ge, E'=C, AND R=Ph

In a melt-sealed NMR tube, 0.080 g or 0.111 mmol corresponding to 1.0 eq of [nBu$_4$N][(Cl$_3$Si)$_3$Ge],
0.015 g or 0.112 mmol corresponding to 1.0 eq of AlCl$_3$ and
0.031 g or 0.111 mmol corresponding to 1.0 eq of Ph$_3$CCl
were reacted in 0.7 ml of CD$_2$Cl$_2$ solvent, whereby a yellow solution with yellow solid was obtained.

The solvent was removed at atmospheric pressure.

By means of extraction with 3×3 ml of boiling n-hexane and subsequent crystallization, neopentatetrelane (C) where E=Ge, E'=C, and R=Ph was obtained in the form of yellow crystals.

The $^{29}$Si {$^1$H}-NMR spectrum of this example is shown in FIG. 5A. FIG. 5B shows the crystal structure of this neopentatetrelane.

Results of a $^1$H, $^{13}$C and $^{29}$Si NMR spectroscopic analysis:
$^{29}$Si NMR (99.4 MHz, CD$_2$Cl$_2$): δ=8.2 ppm.
$^1$H NMR (500.2 MHz, CD$_2$Cl$_2$): δ=7.38-7.28 ppm (m, (Cl$_3$Si)$_3$GeCPh$_3$),
δ=7.16-7.12 ppm (m, 2H, (Cl$_3$Si)$_3$GeCPh$_3$);
$^{13}$C{$^1$H} NMR (125.8 MHz, CD$_2$Cl$_2$): δ=144.3 ((Cl$_3$Si)$_3$GeCPh$_3$(-ipso)),
131.4 ((Cl$_3$Si)$_3$GeCPh$_3$(-ortho)), 129.8 ((Cl$_3$Si)$_3$GeCPh$_3$(-para)),
128.2 ((Cl$_3$Si)$_3$GeCPh$_3$(-metha)), 70.3 ppm ((Cl$_3$Si)$_3$GeCPh$_3$);
$^1$H/$^{13}$C HMBC NMR (500.2/125.8 MHz, CD$_2$Cl$_2$):
δ=7.38-7.28/144.3, 7.38-7.28/131.4, 7.38-7.28/129.8, 7.38-7.28/128.2, 7.16-7.12/7.16-7.12/144.3, 7.16-7.12/131.4, 7.16-7.12/129.8, 7.16-7.12/128.2, 7.16-7.12/70.3 ppm;
$^1$H/$^{29}$Si HMBC NMR (500.2/99.4 MHz, CD$_2$Cl$_2$): δ=7.16-7.12/8.2 ppm.

EXAMPLE 6: PREPARATION OF NEOPENTATETRELANE (C), WHERE E=Ge, E'=Si, AND R=Ph

In a melt-sealed NMR tube, 0.100 g or 0.139 mmol corresponding to 1.0 eq of [nBu$_4$N][(Cl$_3$Si)$_3$Ge],
0.019 g or 0.142 mmol corresponding to 1.0 eq of AlCl$_3$ and
0.041 g or 0.139 mmol corresponding to 1.0 eq of Ph$_3$SiCl
were reacted in 0.8 ml of CD$_2$Cl$_2$ solvent, whereby a yellow solution with yellow solid was obtained.

The solvent was removed at atmospheric pressure.

By means of extraction with 3×3 ml of boiling n-hexane and subsequent crystallization, neopentatetrelane (C) where E=Ge, E'=Si, and R=Ph was isolated in the form of yellow crystals.

The $^{29}$Si-NMR spectrum of this example is shown in FIG. 6A. FIG. 6B shows the crystal structure of this neopentatetrelane.

Results of a $^{13}$C and $^{29}$Si-NMR spectroscopic analysis:
$^{29}$Si NMR (99.4 MHz, CD$_2$Cl$_2$): δ=9.7 ppm (s, (Cl$_3$Si)$_3$GeSiPh$_3$),
−6.5 ppm (m, (Cl$_3$Si)$_3$GeSiPh$_3$).
$^{13}$C{$^1$H} NMR (125.8 MHz, CD$_2$Cl$_2$): δ=137.1, 134.5, 131.7, 129.2 ppm.

EXAMPLE 7: PREPARATION OF NEOPENTATETRELANE (C), WHERE E=E'=Ge AND R=Ph

In a melt-sealed NMR tube, 0.081 g or 0.113 mmol corresponding to 1.0 eq of [nBu$_4$N][(ClSi)$_3$Ge],
0.015 g or 0.112 mmol corresponding to 1.0 eq of AlCl$_3$ and
0.038 g or 0.112 mmol corresponding to 1.0 eq of Ph$_3$GeCl
were reacted in 0.7 ml of CD$_2$Cl$_2$ solvent, whereby a pale yellow solution was obtained.

The solvent was removed at atmospheric pressure.

By means of extraction with 3×4 ml of n-hexane and subsequent crystallization, neopentatetrelane (C) where E=E'=Ge and R=Ph was isolated in the form of pale yellow crystals.

The $^{29}$Si-NMR spectrum of this example is shown in FIG. 7A. FIG. 7B shows the crystal structure of this neopentatetrelane.

Results of a $^1$H, $^{13}$C and $^{29}$Si NMR spectroscopic analysis:

$^{29}$Si NMR (99.4 MHz, CD$_2$Cl$_2$): δ=9.2 ppm (s, (Cl$_3$Si)$_3$GeGePh$_3$).

$^1$H NMR (500.2 MHz, CD$_2$Cl$_2$): δ=7.65-7.64 ppm (m, 2H),
7.54-7.50 ppm (m, 1H), 7.49-7.46 ppm (m, 2H);

$^{13}$C{$^1$H} NMR (125.8 MHz, CD$_2$Cl$_2$): δ=136.0, 133.1, 130.9, 129.4 ppm.

The invention claimed is:

1. A neopentatetrelane of the formula C

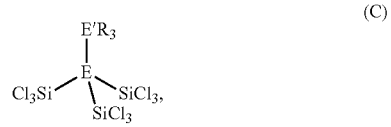

wherein each independently in pairs E is Si or Ge; E' is C, Si, or Ge; and R is Me, Et, or Ph.

2. A method for preparing a neopentatetrelane of the formula C,

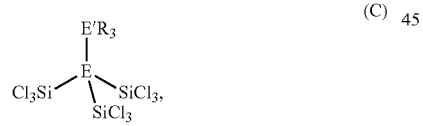

wherein each independently in pairs E is Si or Ge; E' is C, Si, or Ge; and R is Cl, Me, Et, or Ph, the method comprising:

(a) dissolving a salt [X$_4$N]— or [X$_4$P]-tris(trichlorosilyl) tetrelide in a solvent,
wherein the radical X is at least one selected from the group consisting of Me, Et, iPr, nBu, and Ph,
wherein the tris(trichlorosilyl)tetrelide has the formula A—

wherein E=Si or Ge;

(b) reacting the tris(trichlorosilyl)tetrelide dissolved in step (a) with a Lewis acid to produce a disilene or germasilene having the formula B

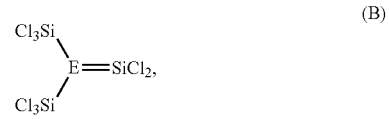

wherein E=Si or Ge; and (c) reacting the disilene or germasilene B with a tetrel chloride R$_3$E'-Cl at a temperature of −80° C. to 40° C. to obtain the neopentatetrelane C,
wherein E'=C, Si, or Ge, and R=Cl, Me, Et, or Ph;
or (d) contacting the tris(trichlorosilyl)tetrelide dissolved in step (a) with a suspension at a temperature of −80° C. to 40° C. comprising a Lewis acid, a tetrel chloride R$_3$E'-Cl, and a solvent, wherein E'=C, Si, or Ge, and R=Cl, Me, Et, or Ph, to obtain the neopentatetrelane C.

3. The method of claim 2, wherein the steps (b) and (c), or the step (d), are or is carried out at room temperature.

4. The method of claim 2, wherein the solvent used in step (a) and/or in step (d) is at least one independently selected from the group consisting of dichloromethane, benzene, C$_6$D$_6$, and CD$_2$Cl$_2$.

5. The method of claim 2, wherein X=nBu.

6. The method of claim 2, wherein the Lewis acid in step (b) or (d) is AlCl$_3$.

7. The method of claim 2, wherein the step (d) or the steps (b) and (c) are each carried out with mixing,
the method further comprising after step (d) or (c) removing the solvent over a total period of 1 to 24 hours to extract the neopentatetrelane C.

8. A method for preparing a compound of the formula B,

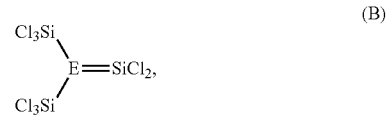

wherein E=Si or Ge,
the method comprising:

(a) dissolving a salt [X$_4$N]— or [X$_4$P]-tris(trichlorosilyl) tetrelide in a solvent,
wherein the radical X is at least one selected from the group consisting of Me, Et, iPr, nBu, and Ph,
wherein the tris(trichlorosilyl)tetrelide has the formula A—

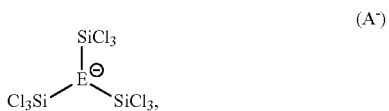

wherein E=Si or Ge, (b) reacting the tris(trichlorosilyl)tetrelide dissolved in step (a) with a Lewis acid and an anthracene or an anthracene derivative to obtain the compound of the formula B.

9. A method for preparing $(Cl_3Si)_4Ge$, comprising:
(a) dissolving a salt $[X_4N]$— or $[X_4P]$-tris(trichlorosilyl) tetrelide in a solvent,
wherein the radical X is at least one selected from the group consisting of Me, Et, iPr, nBu, and Ph,
wherein the tris(trichlorosilyl)tetrelide has the general formula A—

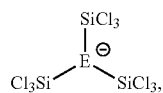   (A⁻)

wherein E=Ge;
(b) reacting the tris(trichlorosilyl)tetrelide dissolved in step (a) with a Lewis acid to produce a disilene or germasilene having the general formula B

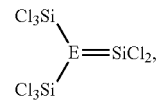   (B)

wherein E=Ge; and
(c) reacting the disilene or germasilene B with a tetrel chloride of $Cl_4Si$ at a temperature of −80° C. to 40° C. to obtain $(Cl_3Si)_4Ge$;
or
(d) contacting the tris(trichlorosilyl)tetrelide dissolved in step (a) with a suspension at a temperature of −80° C. to 40° C. comprising a Lewis acid, a tetrel chloride of $Cl_4Si$, and a solvent to obtain $(Cl_3Si)_4Ge$.

10. A method of generating a GeSi layer, comprising using the neopentatetrelane C of claim 1.

* * * * *